United States Patent [19]

Yukawa et al.

[11] Patent Number: 5,346,958

[45] Date of Patent: Sep. 13, 1994

[54] CURABLE COATING COMPOSITIONS CONTAINING POLYSTYRENE MICROPARTICLES

[75] Inventors: Yoshiyuki Yukawa, Hiratsuka; Motoshi Yabuta, Hadano; Akimasa Nakahata, Hiratsuka; Yuzo Miyamoto, Yokohama; Masaaki Kobayashi, Kobe; Naruhito Ueno, Aichi, all of Japan

[73] Assignee: Kansai Paint Company, Limited, Amagasaki, Japan

[21] Appl. No.: 46,987

[22] Filed: Apr. 16, 1993

[30] Foreign Application Priority Data

Apr. 20, 1992 [JP] Japan .................. 4-099950

[51] Int. Cl.$^5$ .................. C08F 8/30; C08F 8/32; C08L 75/04
[52] U.S. Cl. .................. 525/124; 427/407.1; 428/357; 428/500; 428/502; 525/123; 525/162; 525/194; 525/328.8; 525/329.2; 525/329.5; 525/330.1; 525/330.3; 525/330.5; 525/333.3; 525/333.6; 525/374; 525/379
[58] Field of Search .................. 525/162, 124, 330.3, 525/330.5; 427/407.1

[56] References Cited

U.S. PATENT DOCUMENTS

| | | | |
|---|---|---|---|
| 4,242,384 | 12/1980 | Andrew | 427/421 |
| 4,297,448 | 10/1981 | Chang | 525/162 |
| 4,427,820 | 1/1984 | Backhouse | 524/504 |
| 4,452,945 | 6/1984 | Bowen | 525/161 |
| 4,468,493 | 8/1984 | Ishikura | 525/123 |
| 4,490,417 | 12/1984 | Shindow | 427/388.3 |
| 4,639,394 | 1/1987 | Das | 428/327 |
| 4,751,112 | 6/1988 | Smith, Jr. | 427/388.3 |
| 4,916,254 | 4/1990 | Watanabe | 560/185 |

*Primary Examiner*—Fred Zitomer
*Attorney, Agent, or Firm*—Armstrong, Westerman, Hattori, McLeland & Naughton

[57] ABSTRACT

A curable top coating composition essentially including (A) a hydroxyl-containing vinyl type resin containing 45 to 55% by weight of styrene monomer as a copolymerized unit of the resin, (B) at least one member selected from among amino resins and (blocked) polyisocyanate compounds, and (C) a microparticulate polymer having an average particle diameter within the range of 0.01 to 1 μm and containing 40 to 60% by weight of styrene monomer as a copolymerized component of each particle, wherein the cured film from the coating composition contains the styrene-derived benzene ring in a proportion of 13 to 40% by weight of the total resin solids;

a coating method using the above coating composition, and a coated article obtainable by using the above coating composition.

11 Claims, 1 Drawing Sheet

CURABLE COATING COMPOSITIONS CONTAINING POLYSTYRENE MICROPARTICLES

FIELD OF THE INVENTION

The present invention relates to a coating composition which provides a highly acid resistant and mar-resistant cured film and is particularly suitable for the top coating of automotive bodies.

BACKGROUND OF THE INVENTION

Among the important performance parameters of automotive finish coatings are smoothness, gloss and distinctness-of-image. The currently used automotive top coating based on a hydroxyl-containing acrylic resin and an amino resin is good enough to provide a finish coat satisfactory in appearance, weather resistance, physical properties and the like. However, the recent aggravation of atmospheric pollution and the consequent acid rain destroying woods and ecology in general, for instance, are presenting serious social problems and under the circumstances the automotive body coated with the above coating material is not sufficiently resistant to surface corrosion or aging. The finishes on articles used outdoors are also etched or suffer blushing and staining under the influence of acid rains. Therefore, the development of a coating film excellent in acid resistance has been earnestly sought. Aside from the above problems, the finish coat on the exterior surface of the car body is liable to be marred, for example by car-washer brushes, to impair its surface appearance and, therefore, mar resistance is also an important quality parameter that must be improved.

The primary object of the present invention is to provide a top coating composition capable of yielding a cured film with remarkably increased acid resistance without being compromised in appearance, weather resistance and physical properties.

The inventors of the present invention found, after assiduous and diligent research to overcome the above-mentioned disadvantages of the prior art coating composition, that the above object can be accomplished by providing a coating composition designed to insure the presence of benzene rings in a proportion of 13 to 40% by weight in a cured film containing a specified microparticulate polymer. The present invention has been developed on the basis of the above finding.

SUMMARY OF THE INVENTION

The present invention is, therefore, directed to a curable top coating composition comprising:
(A) a hydroxyl-containing vinyl type resin containing 45 to 55% by weight of styrene monomer as a copolymerized unit of the resin,
(B) at least one member selected from among amino resins and (blocked) polyisocyanate compounds, and
(C) a microparticulate polymer having an average particle diameter within the range of 0.01 to 1 μm and containing 40 to 60% by weight of styrene monomer as a copolymerized component of each particle,
wherein the cured film from said coating composition contains the styrene-derived benzene ring in a proportion of 13 to 40% by weight of the total resin solids.

The present invention is further directed to a coating method utilizing said coating composition and to an article finished with said coating composition.

DETAILED DESCRIPTION OF THE INVENTION

Figure 1:
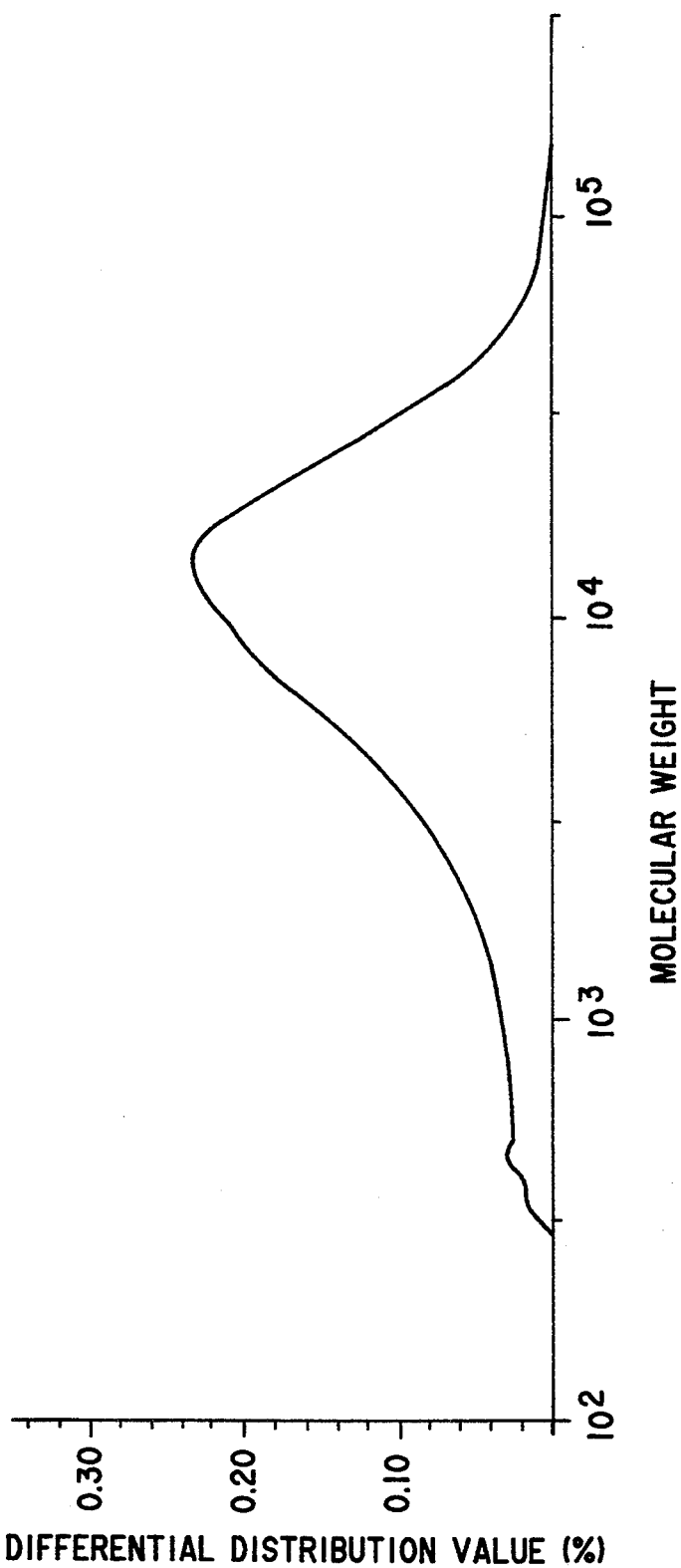
FIG. 1 is a graph illustrating the distribution of benzene rings as a function molecular weight in fractions of a hydroxyl-containing acrylic resin obtained by gel permeation chromatography.

The coating composition according to the present invention is now described in the first place.

The hydroxyl-containing vinyl type resin as a component of the coating composition of the present invention is a vinyl type resin containing 45 to 55% by weight of styrene monomer as a copolymerized unit and, to mention a preferred example, is a vinyl resin which can be produced by copolymerizing 45 to 55% by weight of styrene monomer, 5 to 45% by weight of a hydroxyl-containing vinyl type monomer and 1 to 45% by weight of other vinyl type monomer or monomers.

The proportion of styrene monomer to be contained as a copolymerized unit in said hydroxyl-containing vinyl type resin must be in the range of 45 to 55% by weight and is preferably 48 to 53% by weight, based on the total monomer component. If the proportion of styrene monomer is less than 45% by weight, the surface hardness, appearance and acid resistance of the film tend to be not fully satisfactory, while the use of styrene monomer in excess of 55% by weight would result in poor weather resistance.

The hydroxyl-containing vinyl type monomer can be any monomer containing one vinyl group and one or more hydroxyl groups within each molecule, and as such, mono(meth)acrylic esters of dihydric alcohols, ε-caprolactone-modified vinyl monomers, etc. can be mentioned by way of example.

The (meth)acrylic esters of dihydric alcohols include, among others, 2-hydroxyethyl (meth)acrylate, hydroxypropyl (meth)acrylate, 2,3-dihydroxypropyl (meth)acrylate, 1,4-butanediol monoacrylate, (poly) ethylene glycol mono(meth)acrylate and so on.

The ε-caprolactone-modified vinyl monomers include monomers of the formula

wherein R represents H or CH₃; n represents 0.5 to 5. Included, as such, are Placcel FA-1, Placcel FA-2, Placcel FA-3, Placcel FA-4, Placcel FA-5, Placcel FM-1, Placcel FM-2, Placcel FM-3, Placcel FM-4 and Placcel FM-5 (Placcel is a trademark of Daicel Chemical Industries, Ltd.; all are 2-hydroxyethyl (meth)acrylate compounds), although these are not exclusive choices.

The above-mentioned hydroxyl-containing vinyl type monomers can be used alone or in combination. Among these monomers, 1,4-butanediol monoacrylate and ε-caprolactone-modified (meth)acrylates of the above general formula are highly copolymerizable with styrene monomer and conducive to formation of a cured film excellent in mar resistance. Therefore, it is preferable to use at least one of 1,4-butanediol monoacrylate and ε-caprolactone-modified (meth)acrylates, either alone or in combination with other hydroxyl-containing vinyl type monomer or monomers. When any other hydroxyl-containing vinyl type monomer is used in combination, it is preferable to insure that at least one of 1,4-butanediol monoacrylate and ε-caprolactone-modified (meth)acrylate be present in a proportion of more than about 5% by weight, preferably more than about 30% by weight, based on the total hydroxyl-containing vinyl type monomer component.

The proportion of the hydroxyl-containing vinyl type monomer as a copolymerized unit in the hydroxyl-containing containing vinyl type resin is generally 5 to 45% by weight and preferably 12.5% to 36% by weight, based on the total monomer component. If the proportion is less than 5% by weight, the curability of the film will not be as good as desired and, hence, the acid resistance, mar resistance and other performance parameters of the cured film may be adversely affected. On the other hand, when the proportion of the hydroxyl-containing vinyl type monomer exceeds 45% by weight, the appearance and water resistance of the film will not be as satisfactory as desired.

The other vinyl type monomers which can be used as copolymerizable units in the production of said hydroxyl-containing vinyl type resin include, among others, a variety of known radical-polymerizable monomers such as (meth)acrylic esters of monohydric alcohols containing 4 to 24 carbon atoms, e.g. n-butyl (meth)acrylate, isobutyl (meth)acrylate, t-butyl(meth)acrylate, 2-ethylhexyl acrylate, n-octyl (meth)acrylate, lauryl (meth)acrylate, tridecyl (meth)acrylate, stearyl (meth)acrylate, etc., (meth)acrylic acid, maleic acid, maleic anhydride, (meth)acrylonitrile and so on. These monomers can be selectively used alone or in combination. Among the above-mentioned monomers, (meth)acrylic esters of monoalcohols of 4 to 24 carbon atoms are preferred and any of them is preferably used in a proportion of at least 95% by weight of the total other vinyl type monomer.

The proportion of said other vinyl type monomer is about 1 to 45% by weight, preferably about 5 to 40% by weight, based on the total monomer component of said hydroxyl-containing vinyl type resin. If the proportion is less than about 1% by weight, the mar resistance, weather resistance and workability may not be as satisfactory as desired. If the limit of about 45% by weight is exceeded, the mar resistance and acid resistance, among others, will be adversely affected.

Though (meth)acrylic esters of monoalcohols of 1 to 3 carbon atoms are also known and used commonly as vinyl monomers, the use of these monomers is preferably avoided in the present invention because they tend to adversely affect the mar resistance and acid resistance of the final film.

The preferred monomer composition of the hydroxyl-containing vinyl type resin in the present invention comprises 45 to 55% by weight of styrene monomer, 5 to 45% by weight of at least one hydroxyl-containing vinyl type monomer selected from among 1,4butanediol monoacrylate and ε-caprolactone-modified (meth) acrylates, optionally in combination with hydroxyethyl acrylate or hydroxypropyl acrylate, and 1 to 45% by weight of one or more other monomers as preferably selected from among (meth)acrylic esters of monoalcohols of 4 to 12 carbon atoms such as n-butyl (meth)acrylate, lauryl (meth)acrylate, and so on. Particularly improved copolymerizability with styrene as well as marked reduction in the formation of styrene oligomers in the low molecular weight region (weight average molecular weights not greater than 2000) can be realized by using, as said hydroxyl-containing vinyl type monomer, an acrylate monomer such as 1,4-butanediol monoacrylate, ε-caprolactone-modified acrylate, hydroxyethyl acrylate or the like and, as said other monomer, (meth)acrylic ester of a monoalcohol of 4 to 12 carbon atoms, such as n-butyl acrylate. Then, there can be obtained a film with markedly improved acid resistance without adversely affecting its weather resistance.

The copolymerization reaction of styrene monomer, hydroxyl-containing vinyl type monomer and other vinyl type monomer can be carried out in the same manner as the synthesis of ordinary acrylic resin or vinyl resin. An exemplary process comprises dissolving or dispersing said monomers in an organic solvent and heating the system in the presence of a radical polymerization initiator with constant stirring at a temperature of about 60° to 180° C. The reaction time is generally about 1 to 10 hours.

The organic solvent which can be used for this reaction includes, among others, various hydrocarbons such as heptane, toluene, xylene, octane, mineral spirit, etc., esters such as ethyl acetate, n-butyl acetate, isobutyl acetate, methylcellosolve acetate, butylcarbitol acetate, etc., ketones such as methyl ethyl ketone, methyl isobutyl ketone, diisobutyl ketone, etc., alcohols such as methanol, ethanol, isopropyl alcohol, n-butanol, sec-butanol, isobutyl alcohol, etc., and ethers such as n-butyl ether, dioxane, ethylene glycol monomethyl ether, ethylene glycol monoethyl ether and so on. When, among these solvents, a hydrocarbon is employed, it is preferably used in combination with some other solvent from solubility points of view. The radical polymerization initiator can be any of the initiators commonly employed. Thus, for example, peroxides such as benzoyl peroxide, t-butyl peroxy-2-ethylhexanoate, etc. and azo compounds such as azobisisobutyronitrile, azobisdimethylvaleronitrile, etc. can be mentioned.

The weight average molecular weight of the hydroxyl-containing vinyl type resin thus produced is preferably in the range of 3000 to 30000. If the molecular weight is less than 3000, the weather resistance of the film will not be fully satisfactory, while the finished appearance will be adversely affected if the molecular weight exceeds 30000.

The hydroxyl value of said hydroxyl-containing vinyl type resin is generally 60 to 140 mg KOH/g resin and preferably 90 to 120 mg KOH/g resin. If the hydroxyl value is less than 60 mg KOH/g resin, the mar resistance of the film will not be sufficient. On the other hand, if the hydroxyl value exceeds 140 mg KOH/g resin, the finished appearance of substrates will not be as satisfactory as desired because the compatibility of the resin with the melamine resin, polyisocyanate compound or other crosslinking agent and microparticulate polymer will then be adversely affected.

In the practice of the present invention, it is advisable to employ, as said hydroxyl-containing vinyl type monomer, at least 10% by weight of at least one monomer selected from among 1,4-butanediol monoacrylate and ε-caprolactone-modified (meth)acrylates and copolymerize a mono(meth)acrylic ester of a dihydric alcohol of 2 or 3 carbon atoms so as to provide for a hydroxyl value of 60 to 140 mg KOH/g resin.

The amino resin or (blocked) polyisocyanate compound for use in the coating composition of the present invention is intended to crosslink said hydroxyl-containing vinyl type resin and will hereinafter be referred to as a crosslinking agent.

The amino resin may be any of melamine resins which are commonly used in the conventional thermosetting acrylic resin coating compositions. Thus, for example, a variety of known partially or completely N-hydroxymethylated (methylol) amino resins which are obtainable by reacting an amino compound, such as melamine, urea, benzoguanamine, acetoguanamine, spiroguanamine, dicyandiamide, etc., with an aldehyde compound can be mentioned. The aldehyde compound mentioned above includes, formaldehyde, paraformaldehyde, acetaldehyde and benzaldehyde. It is also possible to use alcohol-modified amino resins obtained by etherification of said methylol amino resins with appropriate alcohols. The alcohols which can be used for such etherification include methyl alcohol, ethyl alcohol, n-propyl alcohol, isopropyl alcohol, n-butyl alcohol, isobutyl alcohol, 2ethylbutanol, 2-ethylhexanol and so on. In the practice of the present invention, it is preferable to use hexamethoxymethylmelamine or an etherified melamine resin obtainable by partial or complete substitution of its methoxy groups with $C_4$ or higher alcohols. When hexamethoxymethylmelamine or the etherified melamine resin is used, it is preferable to add an ordinary curing catalyst such as p-toluenesulfonic acid or dodecylbenzenesulfonic acid.

When such a strong acid catalyst is employed, the resin system may be neutralized (blocked) with an amine compound, such as triethylamine, diethanolamine, 2-amino-2-methylpropanol or the like, so as to insure a sufficient shelf-life to a one-package coating system.

Commercial resins in the above melamine resin series include, among others, butylated melamine resin (Mitsui Toatsu Chemicals' U-Van 20 SE-60 and U-Van 225; Dainippon Ink and Chemicals' Super-Beckamine G840, Super-Beckamine G821, etc.), methylated melamine resin (Mitsui Cyanamid's Cymel 303; Sumitomo Chemical's Sumimal M-100, Sumimal M-40S,etc.), methyl etherified melamine resin (Mitsui Cyanamid's Cymel 303, Cymel 325, Cymel 327, Cymel 350, Cymel 370; Sanwa Chemical's Nikalac MS17, Nikalac MS15, Monsanto's Resimene 741; Sumitomo Chemical's Sumimal M55; etc.), methyl butyl mix-etherified melamine resin (Mitsui Cyanamid's Cymel 235, Cymel 202, Cymel 238, Cymel 254, Cymel 272, Cymel 1130; Sumitomo Chemical's Sumimal M66B), methyl isobutyl mix-etherified melamine resin (Mitsui Cyanamid's Cymel XV805; Sanwa Chemical's Nikalac MS95; etc.).

The polyisocyanate compound may be whichever of a free isocyanate compound and a blocked isocyanate compound. The polyisocyanate compounds having free isocyanato groups include organic diisocyanates, e.g. aliphatic diisocyanates such as hexamethylene diisocyanate, trimethylhexamethylene diisocyanate, etc., alicyclic diisocyanates such as isophorone diisocyanate etc. and aromatic diisocyanates such as xylylene diisocyanate, tolylene diisocyanate, 4,4'-diphenylmethane diisocyanate, etc., adducts of a stoichiometric excess of any of such organic diisocyanates to a polyhydric alcohol, low molecular polyester resin, water or the like, polymers of two or more organic diisocyanates such as those mentioned above, isocyanate biurets, and so on. As typical examples of commercial products in this series, there can be mentioned Burnock D-750, -800, DN-950, -970 and 15-455 (Dainippon Ink and Chemicals), Desmodur L, N, HL and N3390 (Bayer, Germany), Takenate D-102, -202, -110 and -123N) (Takeda Chemical Industries, Ltd.), Coronate EH, L, HL and 203 (Nippon Polyurethane Industry) and Duranate 24A-90CX (Asahi Kasei Kogyo) and so on. The polyisocyanate compounds having blocked isocyanato groups include compounds formed as the above-mentioned free polyisocyanate compounds are blocked with known blocking agents such as oximes, phenols, alcohols, lactams, malonic esters, mercaptans and so on. Among typical examples of such blocked polyisocyanates are Burhock D-550 (Dainippon Ink and Chemicals), Takenate B-815-N (Takeda Chemical Industries), Additol VXL-80 (Hoechst, Germany) and Coronate 2507 (Nippon Polyurethane Industry).

In addition to the above components, the coating composition of the present invention contains a microparticulate polymer having an average particle diameter of 0.01 to 1 $\mu$m and containing 40 to 60% by weight of styrene monomer as a copolymerized component of each microparticle. The polymer constituting such microparticles must be insoluble in the organic solvent used in the formulation of the coating composition of the invention. Moreover, this polymer may be crosslinked or not crosslinked but is preferably crosslinked. The microparticulate polymers per se are known and a suitable one can be selected from among the conventional microparticulate polymers. Particularly the following can be employed with advantage.

(A) Nonaqueous dispersion type vinyl resin

The nonaqueous dispersion type vinyl resin can be prepared by dispersion-polymerizing a vinyl monomer charge containing 40 to 60% by weight of styrene monomer in the presence of a polymer dispersion stabilizer and an organic solvent. The polymer dispersion stabilizer may be any of the stabilizers known to the nonaqueous dispersion technology. For example, the following stabilizers (1) through (9) can be employed.

(1) A polyester macromonomer containing about 1.0 polymerizable double bond per molecule as prepared by the addition reaction between a self-condensing polyester of a hydroxyl-containing fatty acid such as 12-hydroxystearic acid and either glycidyl acrylate or glycidyl methacrylate.

(2) A comb-shaped polymer formed on copolymerization of said polyester macromonomer (1) with a vinyl monomer.

Among examples of the vinyl monomer mentioned just above are $C_{1-24}$ alkyl or cycloalkyl esters of (meth)acrylic acid, such as methyl (meth)acrylate, ethyl (meth)acrylate, propyl (meth)acrylate, butyl (meth)acrylate, 2-ethylhexyl (meth)acrylate, octyl (meth)acrylate, lauryl (meth)acrylate, tridecyl (meth)acrylate, stearyl (meth)acrylate, cyclohexyl (meth)acrylate and so on. In addition, where necessary, hydroxyalkyl esters of (meth)acrylic acid, such as hydroxyethyl (meth)acrylate, hydroxypropyl (meth) acrylate, etc., (meth)acrylic acid, (meth)acrylonitrile, styrene, etc. can likewise be employed.

(3) A polymer obtainable by copolymerizing a minor proportion of glycidyl (meth)acrylate with the above polymer (2) and subsequently adding (meth-)acrylic acid to the glycidyl group so as to introduce double bonds.

(4) A hydroxyl-containing acrylic copolymer obtainable by copolymerizing a comparatively long-chain low polarity monomer, such as (meth)acrylic acid esters of monoalcohols of 4 or more carbon atoms, e.g. n-butyl (meth)acrylate, 2-ethylhexyl (meth)acrylate, dodecyl (meth)acrylate, lauryl (meth)acrylate or stearyl (meth)acrylate, with a minor proportion of a hydroxyl-containing vinyl type monomer (same as the above-mentioned) and, where necessary, further with methyl (meth)acrylate, ethyl (meth)acrylate, propyl (meth)acrylate, (meth)acrylic acid, glycidyl (meth)acrylate, styrene, etc.

(5) The polymer corresponding to the above polymer (4) which contains, at least 0.3 double bond per molecule on the basis of number average molecular weight. Such double bonds can be introduced, for example by subsequent addition of isocyanatoethyl (meth)acrylate to some of hydroxyl groups in the acrylic copolymer or by copolymerizing a minor proportion of glycidyl (meth)acrylate with the substrate acrylic copolymer and subsequently adding (meth)acrylic acid to the glycidyl group.

(6) An alkylmelamine resin with a high mineral spirit tolerance.

(7) An alkyd resin with an oil length of not less than 15% and/or the corresponding alkyd resin containing polymerizable double bonds introduced. Such polymerizable double bonds can be introduced, for example by adding glycidyl (meth)acrylate to the carboxyl group in the alkyd resin.

(8) An oil-free polyester resin with a high mineral spirit tolerance.

(9) A cellulose acetate butyrate containing polymerizable double bonds introduced. Such polymerizable double bonds can be introduced, for example by adding isocyanatoethyl methacrylate to cellulose acetate butyrate.

These dispersion stabilizers can be used alone or in a combination of different types. The number average molecular weight of said dispersion stabilizer is preferably in the range of about 1000 to 50000 and more desirably in the range of about 3000 to 20000.

Among the above-mentioned dispersion stabilizers, those which are especially suitable for purposes of the present invention are stabilizers which are soluble in solvents having comparatively low polarility, such as aliphatic hydrocarbons, and capable of meeting the film performance requirements. Particularly preferred, as such dispersion stablizers, are the above-mentioned acrylic copolymers (4) and (5) which can be easily adjusted in molecular weight, glass transition temperature, polarity (polymer SP value), hydroxyl value, acid value, etc. and are excellent in whether resistance, too. Moreover, acrylic copolymers containing an average of about 0.2 to 1.2 polymerizable double bonds capable of graft polymerization with dispersed microparticulate polymers are preferred.

The nonaqueous dispersion type vinyl resin for use in the present invention can be easily prepared by dispersion-polymerizing at least one vinyl monomer species in the presence of said polymer dispersion stabilizer in an organic solvent mainly containing an aliphatic hydrocarbon, which dissolves said dispersion stabilizer and the below-mentioned vinyl monomer forming said microparticulate polymer but does not substantially dissolve the microparticulate polymer formed from said vinyl monomer.

The vinyl monomer forming a microparticulate polymer mentioned above is a monomeric mixture comprising 40 to 60% by weight of styrene monomer and 40 to 60% by weight of one or more other vinyl monomers.

The other vinyl monomers mentioned above are monomers having comparatively high polarity and $C_{1-4}$ alkyl esters of (meth)acrylic acid, e.g. methyl (meth)acrylate, ethyl (meth)acrylate, butyl (meth)acrylate, etc., and nitrile compounds, e.g. (meth)acrylonitrile, can be employed with advantage. In addition to the above vinyl monomers, (meth)acrylic acid, 2-hydroxyethyl (meth)acrylate, etc. can also be used, where necessary.

It is also possible to copolymerize a polyfunctional monomer, such as divinylbenzene or ethylene glycol dimethacrylate, in a minor proportion, with the above monomeric mixture, copolymerize a plurality of monomers containing mutually reactive functional groups, such as glycidyl (meth)acrylate and methacrylic acid with the above monomeric mixture, or copolymerize a self-reactive monomer such as an N-alkoxymethylated acrylamide, a γ-methacryloxytrialkoxysilane, etc. with the above monomeric mixture to internally crosslink the microparticles and thereby provide gelled maicroparticulate polymers.

In conducting the dispersion polymerization reaction, the weight ratio of said vinyl monomer forming microparticulate polymer to said dispersion stabilizer is generally 95/5 through 20/80 and preferably 90/10 through 40/60. This dispersion polymerization reaction can be conducted in the presence of a radical polymerization initiator in the conventional manner.

(B) Other Microparticulate Polymer

The other microparticulate polymer may be a powder material obtainable by separating microparticulate polymers from an aqueous dispersion of microparticulate polymers which can be prepared by emulsion-polymerizing a monomeric mixture comprising a cross-linking monomer containing at least two ethylenic double bonds and 40 to 60% by weight of styrene monomer in an aqueous medium with an aid of an anionic or nonionic surfactant, or a dispersion of microparticles in an organic solvent which can be obtained by substituting the organic solvent for the medium water of said aqueous dispersion.

As the aqueous dispersion mentioned above, the dispersion described in Japanese Unexamined Patent Publication No. 47107/1990, for instance, can be employed. Specifically, this is a gelled microparticulate polymer obtainable by the process comprising emulsion-polymerizing (a) a polymerizable monomer containing at least two radical-polymerizable unsaturated groups within each molecule and (b) a polymerizable unsaturated monomer other than (a) with the aid of a reactive emulsifier containing an allyl group within its molecule, optionally in the presence of a water-soluble azoamide compound as the polymerization initiator, preferably such that said (b) component contains styrene monomer as an essential ingredient and that the gelled microparticulate polymer contains 40 to 60% by weight of styrene monomer as a copolymerized unit. The above patent literature contains a full disclosure about such gelled microparticulate polymers and, therefore, the disclosure therein is incorporated in this specification by reference.

The microparticulate polymer for use in the present invention has an average particle diameter in the range of 0.01 to 1 μm, preferably in the range of 0.05 to 0.5 μm. If the average particle diameter is less than 0.01 μm, the coating composition having high solid content can not be obtained and the cured film will not have a sufficient mechanical strength. On the other hand, if the upper limit of 1 μm is exceeded, the storage stability of the coating composition will not be satisfactory.

It is essential that each of such microparticulate polymers contain 40 to 60% by weight of the styrene monomer as a copolymerized component. If this styrene content is below 40% by weight, the cured film will have such defects as milkiness, clouding and gloss reduction due to the difference in refractive index between the microparticulate polymer and the other components. On the other hand, if the limit of 60% by weight is exceeded, the weather resistance of the film will not be sufficient.

In the coating composition of the present invention, the formulation of the various components should be selected so that the film may cure satisfactorily and exhibit the required performance and that benzene rings may account for the specified proportion within the cured film. Generally speaking, it is preferable to insure that on the basis of the total weight of said hydroxyl-containing vinyl type resin, crosslinking agent and microparticulate polymer, the hydroxyl-containing vinyl type resin accounts for about 33 to 90% by weight, the crosslinking agent for about 7 to 33% by weight and the microparticulate polymer for about 0.1 to 33% by weight.

The film formed from the coating composition of the present invention contains benzene rings in a proportion of 13 to 40% by weight, preferably 16 to 33% by weight, based on the total resin of the cured film. If the proportion of benzene rings is less than 13% by weight, the acid resistance and finished appearance of the film will not be satisfactory. On the other hand, if the proportion exceeds 40% by weight, the cured film will not have a sufficient weather resistance.

The proportion of benzene rings in the cured film can be determined by the known analyzing techniques (such as infrared spectrophotometry, pyrolysis gas chromatography, etc.).

The coating composition of the invention may further contain minor amounts of other components such as modified resin of cellulose acetate butyrate, epoxy resin, polyester resin, alkyd resin, acrylic resin and so on. If necessary, an organic solvent, pigment, curing catalyst, UV absorber, coated surface conditioner, antioxidant, rheology modifier, pigment dispersant, silane coupling agent and other additives can also be included.

The organic solvent mentioned above includes hydrocarbons such as heptane, toluene, xylene, octane, mineral spirit, etc., esters such as ethyl acetate, n-butyl acetate, isobutyl acetate, methylcellosolve acetate, butylcarbitol acetate, etc., ketones such as methyl ethyl ketone, methyl isobutyl ketone, diisobutyl ketone, etc., alcohols such as methanol, ethanol, isopropyl alcohol, n-butanol, sec-butanol, isobutyl alcohol, etc., ethers such as n-butyl ether, dioxane, ethylene glycol monomethyl ether, ethylene glycol monoethyl ether, and petroleum-based aromatic solvents such as Swasol 310, Swasol 1000 and Swasol 1500 (a trademark of Cosmo Oil). These organic solvents can be used alone or in combination. From the standpoint of curability, solvents boiling below about 150° C. are preferred but this is not mandatory.

The pigment which can be incorporated in the coating composition of the present invention includes, among others, organic pigments (e.g. quinacridone compounds such as quinacridone, azo compounds such as Pigment Red, phthalocyanines such as phthalocyanine blue, phthalocyanine green, etc.), inorganic pigments (e.g. titanium dioxide, barium sulfate, calcium carbonate, baryta, clay, silica, etc.), and carbon pigments (e.g. carbon black).

The curing catalyst includes, where the crosslinking agent is a (blocked) polyisocyanate compound, dibutyltin diacetate, dibutyltin dioctate, dibutyltin laurate, triethylamine, diethanolamine and so on.

The coating composition of the present invention can be directly applied to a variety of substrates such as metal substrates (e.g. steel sheet, surface-treated steel sheet, etc.) and plastics. It can also be applied to substrates previously coated with a primer or coated with a primer and an intermediate coating. Moreover, when the coating composition is used as an automotive coating, it can be used, for example in a 2-coat/1-bake system or a 2-coat/2-bake system, as the top enamel or top clear coating. It can also be used as a solid color paint in a 1-coat/1-bake system.

With the coating composition of the invention, the desired film can be formed on the substrate by applying the composition in a dry thickness of about 10 to 60 μm using an electrostatic coater (bell-type), air spray coater or the like and heating the wet coat at a temperature of about 120° to 180° C. for 10 to 60 minutes.

When the coating composition of the present invention is used as a clear top coating in said 2-coat/1-bake system or 2-coat/2-bake system, it is preferable to incorporate certain additives, particularly an ultraviolet absorber, an ultraviolet stabilizer or the like.

The ultraviolet absorber which can be used includes, among others, benzophenone compounds such as benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4-methoxybenzophenone, 2-hydroxy-4-octoxybenzophenone, 2-hydroxy-4-dodecyloxybenzophenone, 2-hydroxy-4-methoxy-5-sulfobenzophenone, 5-chloro-2-hydroxybenzophenone, 2,2'-dihydroxy-4,4'-dimethoxy-5-sulfobenzophenone, 2-hydroxy-4-methoxy-2'-carboxybenzophenone, 2-hydroxy-4-(2-hydroxy-3-methylacryloxy)propoxybenzophenone, etc., benzotriazole compounds such as 2-(2'-hydroxy-5'-methylphenyl)benzotriazole, 2-(2'-hydroxy-3',5'-di-tertbutylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3',5'-di-tert-isoamylphenyl)benzotriazole, 2-(hydroxy-5-tert-butylphenyl)benzotriazole, etc., acrylates such as ethyl-2-cyano-3,3'-diphenyl acrylate, 2-ethylhexyl-2-cyano-3,3'-diphenyl acrylate, etc.; salicylates such as phenyl salicylate, 4-tert-butylphenyl salicylate, p-octylphenyl salicylate, etc.; oxalanilides such as ethanediamido-N-(2-ethoxyphenyl)-N'-(4-isododecylphenyl), 2-ethyl-2'-ethoxyoxalanilide, 2-ethoxy-5-tert-butyl-2'-ethyloxalanilide and Sanduvor 3206 (SANDOZ HUNINGUE S.A.), etc.; and such other compounds as hydroxy-5-methoxyacetophenone, 2-hydroxynaphthophenone, 2-ethoxyethyl p-methoxycinnamate, nickel-bisoctylphenyl sulfide, [2,2'-thiobis(4-tert-octylphenolato)]-n-butylamine-nickel and so on. These ultraviolet absorbers can be used alone or in combination.

The ultraviolet stabilizer which can be employed includes, among others, hindered amines such as bis-(1,2,2,6,6-pentamethyl-4-piperidinyl)-2-butyl-2-(4-hydroxy-3,5-di-tert-butylbenzyl)propanedioate, bis(1,2,2,6,6-pentamethyl-4-piperidyl)sebacate, 8-acetyl-3-dodecyl-7,7,9,9-tetramethyl-1,3,8-triazaspiro[4,5]- decane-2,4-dione, Tinuvin 144, 292 and 440 (Ciba-Geigy) and Sanol LS-770 (Sankyo) and so on.

The above ultraviolet absorber can be used independently but is preferably used in combination with the ultraviolet stabilizer. These additives are used preferably in a proportion of about 0.1 to 4 parts by weight based on 100 parts by weight of said hydroxyl-containing vinyl type resin and crosslinking agent combined.

The clear coating composition of the present invention is generally used without addition of a colored pigment but, if desired, a colored pigment may be incorporated to the extent that the colored base coat will not be hidden.

In the present invention, a 2-coat/1-bake coat system can be implemented by applying a colored base coating composition to a substrate, then applying said clear top coating composition and finally baking the coats. Coating of the substrate with said colored base coating composition and clear top coating composition can be carried out by the conventional coating technique such as electrostatic coating or non-electrostatic coating. The thickness of the colored base coat is preferably about 10 to 50 μm (as cured). This base coat is allowed to stand at room temperature for several minutes or force-dried at about 50° to 80° C. for a few minutes after application and, then, the clear top coating composition is applied. The thickness of the clear top coat is preferably 10 to 60 μm (as cured). Then, the coated substrate is baked at a temperature of about 120° to 180° C. for 20 to 40 minutes.

The colored base coating composition is a curable coating composition preferably containing metal flakes and/or mica powder, and such colored base coatings compositions are well known. Specifically, a typical coating composition is a curable organic solvent-type (inclusive of high-solid type and nonaqueous dispersion type) or aqueous-type coating composition, for instance, which contains an acrylic resin, polyester resin, acrylate-polyester resin or the like as the film-forming basal resin and an amino resin or a (blocked) polyisocyanate compound as the crosslinking agent, optionally supplemented with such additives as cellulose acetate butyrate, colored pigment, hueless (extender) pigment, organic polymer microparticles, precipitation inhibitor, antisagging agent, pigment dispersant, UV absorber, etc. The metal flakes mentioned above include aluminum flakes, nickel flakes, copper flakes, stainless steel flakes, brass flakes, chrominum flakes, etc. and the mica powder includes pearl mica, colored pearl mica and so on.

With the coating composition of the present invention, a cured film with remarkably improved acid resistance can be obtained without being compromised in finished appearance, weather resistance and physical properties.

The following production examples, examples and comparative examples are intended to describe the present invention in further detail. It should be understood that unless otherwise indicated, all parts and % are by weight.

(1) Preparation of Samples

PRODUCTION EXAMPLE 1

Production of Hydroxyl-containing Acrylic Resin Solution A

An ordinary acrylic resin reactor equipped with a stirrer, thermometer and reflux condenser was charged with 45 parts of Swasol 1000 (Cosmo Oil's aromatic solvent) and the charge was heated with stirring. When the temperature had reached 125° C., the following monomeric mixture was added dropwise over a period of 3 hours.

| | |
|---|---|
| Styrene | 50 Parts |
| Lauryl methacrylate | 10 Parts |
| n-Butyl acrylate | 7 Parts |
| 1,4-Butanediol monoacrylate | 30 Parts |
| Acrylic acid | 3 Parts |
| α,α'-Azobisisobutyronitrile | 4 Parts |

After completion of the dropwise addition, the charge was held at 125° C. for 30 minutes, after which a mixture of 0.5 part of azobisdimethylvaleronitrile and 20 parts of Swasol 1000 was added dropwise over a period of 1 hour. Thereafter, the stirring was further continued at a constant temperature of 125° C. for 1 hour, at the end of which time the reaction mixture was cooled. This mixture was diluted with 14.8 parts of n-butanol to provide a hydroxyl-containing acrylic resin solution A having a solids (nonvolatile matter) content of 55%. The weight average molecular weight (MW) of this acrylic resin was 13000 and its benzene ring content (the % concentration of benzene ring based on the total monomer charge) was 37%. The benzene ring concentration of acrylic resin was determined by means of the following equation.

$$\text{Concentration (\%)} = \frac{76 \text{ (mol. wt. of phenylene group)} \times 50 \text{ (amount of styrene)}}{104 \text{ (mol. wt. of styrene)} \times 100 \text{ (total amount of monomers)}} \times 100$$

PRODUCTION EXAMPLES 2 THROUGH 7

Production of hydroxyl-containing acrylic resin solutions B through G

Acrylic resin solutions B through G were prepared in the same manner as in Production Example 1. The solids content of each resin solution was 55% by weight. The compositions of acrylic resin solutions A through G, their weight average molecular weigh (MW) values, and the benzene ring concentrations of the acrylic resins are shown in Table 1.

TABLE 1

| Production Example No. | 1 | 2 | 3 | 4 | 5 | 6 | 7 |
|---|---|---|---|---|---|---|---|
| Acrylic resin solution | A | B | C | D | E | F | G |
| Styrene | 50 | 48 | 51 | 50 | 10 | 15 | 30 |
| n-Butyl acrylate | 7 | 11 | 7 | — | — | — | — |
| n-Butyl methacrylate | — | — | — | 7 | 35 | 38 | 21 |
| Lauryl methacrylate | 10 | 10 | — | 10 | 15 | 10 | — |
| Lauryl acrylate | — | — | 5 | — | — | — | — |
| 2-Ethylhexyl methacrylate | — | — | 5 | 8 | 15 | 15 | 20 |
| 2-Hydroxyethyl acrylate | — | 13 | 21 | — | — | 20 | 17 |
| 2-Hydroxyethyl methacrylate | — | — | — | 14 | 22 | — | — |
| 1,4-Butanediol monoacrylate | 30 | 15 | — | 8 | — | — | 10 |

TABLE 1-continued

| Production Example No. | 1 | 2 | 3 | 4 | 5 | 6 | 7 |
|---|---|---|---|---|---|---|---|
| Acrylic resin solution | A | B | C | D | E | F | G |
| Placcel FM-3 | — | — | 15 | — | — | — | — |
| Methacrylic acid | — | — | — | 3 | 3 | — | — |
| Acrylic acid | 3 | 3 | 3 | — | — | 2 | 2 |
| Weight average molecular weight (MW) | 13000 | 10000 | 14000 | 13500 | 13000 | 10000 | 9000 |
| Hydroxyl value | 116.9 | 121.3 | 119.9 | 91.6 | 94.9 | 96.7 | 121.2 |
| Concentration of benzene ring in acrylic resin (%) | 37 | 35 | 37 | 37 | 7 | 11 | 22 |

PRODUCTION EXAMPLE 8

Production of Hydroxyl-containing Acrylic Resin Solution H

An ordinary acrylic resin reactor equipped with a stirrer, thermometer and reflux condenser was charged with 45 parts of Swasol 1000 (Cosmo Oil's aromatic solvent) and the charge was heated with stirring. When the temperature had reached 125° C., the following monomeric mixture was added dropwise over a period of 3 hours.

| Styrene | 50 Parts |
|---|---|
| Lauryl acrylate | 10 Parts |
| n-Butyl acrylate | 7 Parts |
| 1,4-Butanediol monoacrylate | 30 Parts |
| Acrylic acid | 3 Parts |
| α,α'-Azobisisobutyronitrile | 4 Parts |

After completion of the dropwise addition, the charge was held at 125° C. for 30 minutes, after which a mixture of 0.5 part of azobisdimethylvaleronitrile and 20 parts of Swasol 1000 was added dropwise over a period of 1 hour. Thereafter, the stirring was further continued at a constant temperature of 125° C. for 1 hour, followed by cooling. This reaction mixture was diluted with 14.8 parts of n-butanol to provide a hydroxyl-containing acrylic resin solution H having a solids (nonvolatile matter) content of 55%. The weight average molecular weight (MW) of this acrylic resin was 13000.

The above hydroxyl-containing acrylic resin H (styrene-acrylate copolymer) was analyzed using a gel permeation chromatograph (GPC) equipped with a UV detector (ultraviolet spectrophotometer; benzene rings detected at 254 nm). The result is presented in FIG. 1. From this diagram, the distribution of styrene in the polymer can be ascertained. In the acrylic resin H, substantially no styrene-rich oligomers were observed in the low molecular weight region ($\leq$MW2000).

PRODUCTION EXAMPLES 9 through 13

Production of Hydroxyl-containing Acrylic Resin Solutions I through M

Acrylic resin solutions I through M were prepared in the same manner as in Production Example 1. The solids content of each resin solution was 55% by weight. The compositions of acrylic resin solutions H through M and their weight average molecular weight (MW) values are shown in Table 2.

TABLE 2

| Production Example No. | 8 | 9 | 10 | 11 | 12 | 13 |
|---|---|---|---|---|---|---|
| Acrylic resin solution | H | I | J | K | L | M |
| Styrene | 50 | 48 | 51 | 50 | 20 | 30 |
| n-Butyl acrylate | 7 | 11 | — | 25 | — | — |
| n-Butyl methacrylate | — | — | — | — | 38 | 20 |
| Lauryl acrylate | 10 | 10 | 10 | — | — | — |
| 2-Ethylhexyl methacrylate | — | — | — | — | 20 | 20 |
| 2-Hydroxyethyl acrylate | — | 13 | 21 | 12 | 20 | 18 |
| 2-Hydroxyethyl methacrylate | — | — | — | — | — | — |
| 1,4-Butanediol monoacrylate | 30 | 15 | — | 10 | — | 10 |
| Placcel FM-3 | — | — | 15 | — | — | — |
| Acrylic acid | 3 | 3 | 3 | 3 | 3 | 2 |
| Weight average molecular weight (MW) | 13000 | 10000 | 14000 | 13500 | 10000 | 9000 |
| Hydroxyl value | 116.9 | 121.3 | 119.9 | 97.0 | 96.7 | 121.2 |
| Benzene ring in acrylic resin (%) | 37 | 35 | 37 | 37 | 14 | 22 |

PRODUCTION EXAMPLE 14

Production of Nonaqueous Dispersion Type Vinyl Resin a

An ordinary acrylic resin reactor equipped with a stirrer, thermometer and reflux condenser was charged with 45.7 parts of xylene and 5 parts of n-butanol and the charge was heated with stirring. When the temperature had reached 125° C., the following monomeric mixture was added dropwise over a period of 3 hours.

| Styrene | 30 Parts |
|---|---|
| Lauryl methacrylate | 20 Parts |
| n-Butyl acrylate | 10 Parts |
| 2-Ethylhexyl methacrylate | 12 Parts |
| 2-Hydroxyethyl methacrylate | 20 Parts |
| 2-Hydroxyethyl acrylate | 5 Parts |
| Acrylic acid | 3 Parts |
| tert-Butyl peroctoate | 4.6 Parts |

After completion of the dropwise addition, the charge was held at 125° C. for 30 minutes, after which a mixture of 0.5 part of azobisdimethylvaleronitrile and 16 parts of xylene was added dropwise over a period of 1 hour, followed by 5 hours of aging. The solids content of the resulting resin solution was 60%.

To 168 parts of this varnish were added 0.03 part of 4-tert-butylpyrocathecol and 2 parts of glycidyl methacrylate and the mixture was reacted for 5 hours at 125° C. for introduction of polymerizable double bonds. Then, 90 parts of the above reaction product, 48 parts of xylene and 105 parts of heptane were placed in a flask and the monomeric mixture for microparticulate polymer and polymerization initiator shown below were added dropwise over a period of 4 hours at 90° C. Then, 0.5 part of tert-butyl peroctoate was added, followed by 3 hours of aging, and then a nonaqueous dispersion type vinyl resin a was prepared.

| Styrene | 40 Parts |
|---|---|
| Methyl methacrylate | 20 Parts |
| Acrylonitrile | 16 Parts |
| Glycidyl methacrylate | 2 Parts |
| 2-Hydroxyethyl acrylate | 20 Parts |
| Methacrylic acid | 2 Parts |
| α,α'-Azobisisobutyronitrile | 1 Part |

The resin dispersion thus obtained was a milk-like white dispersion with a solids content of 45%.

PRODUCTION EXAMPLE 15

Production of Nonaqueous Dispersion Type Vinyl Resin b

A nonaqueous dispersion type vinyl resin b was prepared according to the same procedure used in the production of vinyl resin a except that the amount of styrene was 30 parts and the amount of methyl methacrylate was 30 parts in the monomeric mixture for microparticulate polymer.

PRODUCTION EXAMPLE 16

Production of Nonaqueous Dispersion Type Vinyl Resin c

A nonaqueous dispersion type vinyl resin c was prepared according to the same procedure used in the production of vinyl resin a except that the amount of styrene was 70 parts, the amount of methyl methacrylate was 0 part and the amount of acrylonitrile was 6 parts in the monomeric mixture for microparticulate polymer.

PRODUCTION EXAMPLE 17

Production of Microgels

A one-liter flask equipped with a stirrer, thermometer, reflux-condensor and heating mantle was charged with 3536.5 parts of deionized water and 51 parts of emulsifier (*1) and the temperature was increased to 90° C. with constant stirring. Then, 20% of an aqueous solution of 12.5 parts of polymerization initiator (*2) in 500 parts of deionized water was added. After an interval of 15 minutes, 5% of monomeric mixture (*3) was added. The reaction mixture was further stirred for 30 minutes, after which the balance of the monomeric mixture and polymerization initiator was added dropwise. This dropwise addition of the monomeric mixture was carried out over a period of 3 hours and that of the polymerization initiator over a period of 3.5 hours. During this procedure, the polymerization temperature was maintained at 90° C.. After completion of dropwise addition of the aqueous initiator solution, the reaction system was further heated at 90° C. for 30 minutes. After cooling to room temperature, the reaction product was recovered using a filter cloth to provide an aqueous dispersion of microgels having a solids content of 20%.

This aqueous dispersion was dried on a stainless steel pad in an electric hot air oven at 60° C. to provide a solid resin. This solid was then dispersed in xylene-n-butanol (50/50, w/w) at 60° C. to prepare a microgel dispersion (average particle diameter 82 nm) with a solids content of 20%.

*1 Emulsifier: Eleminol JS-2 (39% aqueous solution), an allyl-containing sulfosuccinate anionic reactive emulsifier, commercially available from Sanyo Chemical Industries.

*2 Polymerization initiator: VA-080, a water-soluble azoamide initiator [2,2'-azobis[2-methyl-N-[1,1-bis(hydroxymethyl)-2-hydroxyethyl]propionamide], commercially available from Wako Pure Chemical Industries.

*3 Monomeric mixture: styrene/n-butyl acrylate/1,6-hexanediol diacrylate=470/470/60 (parts)

EXAMPLE 1

A mixture of 118 parts (65 parts as nonvolatile matter) of the hydroxyl-containing acrylic resin solution (A) obtained in Production Example 1, 16.6 parts (10 parts as nonvolatile matter) of the nonaqueous dispersion type vinyl resin as obtained in Production Example 14, 25 parts of Cymel XV805 (Note 1), 0.1 part of a surface conditioner (Note 2) and 2 parts of an ultraviolet absorber (Note 3) was stirred and diluted with a solvent mixture of Swasol 1500 (Note 4) and n-butanol (9/1) to a coating viscosity of 25 seconds (Ford cup #4/25° C.) to provide a test sample.

To benzene ring concentration in the coated film as calculated using the following equation was 27%.

$$\text{Concentration (\%)} = \frac{37 \text{ (benzene ring concentration of acrylic resin)} \times 75 \text{ (amount of acrylic resin)}}{100 \text{ (amount of resin in film)}}$$

(Note 1) Cymel XV805 —manufactured by Mitsui Cyanamid, a methyl isobutyl mixed-etherified monomeric melamine resin with a solids content of about 100%.

(Note 2) Surface conditioner: manufactured by Byk Chemie; BYK-300 solution (Note 3) Ultraviolet absorber: manufactured by Ciba-Geigy, Tinuvin 900.

(Note 4) Swazol 1500: Cosmo Oil, an aromatic solvent.

EXAMPLES 2 through 14 and Comparative Examples 1 through 8

Except that the mixture before viscosity adjustment was changed as shown in Table 3, the procedure of Example 1 was otherwise repeated and the samples adjusted to a coating viscosity of 25 seconds (Ford cup #4/25° C.) were tested.

The formulations shown in Table 3 for these Examples and Comparative Examples are values (parts) for solids or active ingredients. Each "Note" in Table 3 indicates the following.

(Note 5) U-Van 20 SE: manufactured by Mitsui Toatsu Chemicals, a butyl-etherified melamine resin solution with a solids content of about 60%, a trade name.

(Note 6) Nacure 5543: manufactured by King Industries, U.S.A., an amine-neutralized dodecylbenzenesulfonic acid with an active ingredient content of about 25%, a trade name.

(Note 7) Sumidur N: manufactured by Sumitomo Bayer Urethane, a non-yellowing polyisocyanate (NCO content 16.5%, nonvolatile matter 75%)

about 20 μm and baked. The coated substrate was wet-sanded with #400 sand paper, drained, dried and degreased with petroleum benzine to provide a test substrate.

Using an air spray gun F5 (Meiji Kikai Seisakusho, a

TABLE 3

| Example No. | | 1 | 2 | 3 | 4 | 5 | 6 | 7 |
|---|---|---|---|---|---|---|---|---|
| Hydroxyl-containing acrylic resin | Type | A | B | C | D | B | A | A |
| | NV | 65 | 65 | 65 | 60 | 65 | 55 | 72 |
| Curing agent | | | | | | | | |
| Amino resin | Type | Cymel XV-805 | Cymel XV-805 | Cymel XV-805 | U-Van 20SE (Note 5) | | Cymel XV-805 | Cymel XV-805 |
| | NV | 25 | 25 | 25 | 30 | | 25 | 25 |
| Polyisocyanate compound | Type | | | | | Sumidur N (Note 7) | | |
| Nonaqueous dispersion type vinyl resin | Type | a | a | a | a | a | a | |
| | NV | 10 | 10 | 10 | 10 | 10 | 20 | |
| Microgel | NV | | | | | | | 3 |
| Nacure 5543 (Note 6) | NV | 1 | 1 | 1 | 1 | | 1 | 1 |
| Surface conditioner (Note 2) | NV | 0.1 | 0.1 | 0.1 | 0.1 | 0.1 | 0.1 | 0.1 |
| UV absorber (Note 3) | NV | 2 | 2 | 2 | 2 | 2 | 2 | 2 |
| Benzene rings in film (%) | | 27 | 25 | 27 | 25 | 25 | 26 | 28 |

| Example No. | | 8 | 9 | 10 | 11 | 12 | 13 | 14 |
|---|---|---|---|---|---|---|---|---|
| Hydroxyl-containing acrylic resin | Type | H | I | J | K | I | H | H |
| | NV | 65 | 65 | 65 | 65 | 65 | 55 | 72 |
| Curing agent | | | | | | | | |
| Amino resin | Type | Cymel XV-805 | Cymel XV-805 | Cymel XV-805 | Cymel XV-805 | | Cymel XV-805 | Cymel XV-805 |
| | NV | 25 | 25 | 25 | 25 | | 25 | 25 |
| Polyisocyanate compound | Type | | | | | Sumidur N (Note 7) | | |
| | NV | | | | | 25 | | |
| Nonaqueous dispersion type vinyl resin | Type | a | a | a | a | a | a | |
| | NV | 10 | 10 | 10 | 10 | 10 | 20 | |
| Microgel | NV | | | | | | | 3 |
| Nacure 5543 (Note 6) | NV | 1 | 1 | 1 | 1 | | 1 | 1 |
| Surface conditioner (Note 2) | NV | 0.1 | 0.1 | 0.1 | 0.1 | 0.1 | 0.1 | 0.1 |
| UV absorber (Note 3) | NV | 2 | 2 | 2 | 2 | 2 | 2 | 2 |
| Benzene rings in film (%) | | 27 | 25 | 27 | 27 | 25 | 26 | 28 |

| Comparative Example No. | | 1 | 2 | 3 | 4 | 5 | 6 | 7 | 8 |
|---|---|---|---|---|---|---|---|---|---|
| Hydroxyl-containing acrylic resin | Type | E | F | G | L | M | A | A | A |
| | NV | 70 | 70 | 75 | 70 | 75 | 75 | 65 | 65 |
| Curing agent | | | | | | | | | |
| Amino resin | Type | U-Van 20SE (Note 5) | U-Van 20SE (Note 5) | Cymel XV-805 | U-Van 20SE (Note 5) | Cymel XV-805 | Cymel XV-805 | Cymel XV-805 | Cymel XV-805 |
| | NV | 30 | 30 | 25 | 30 | 25 | 25 | 25 | 25 |
| Polyisocyanate compound | Type | | | | | | | | |
| | NV | | | | | | | | |
| Nonaqueous dispersion type vinyl resin | Type | a | a | a | a | a | a | b | c |
| | NV | 10 | 10 | 10 | 10 | 10 | 0 | 10 | 10 |
| Microgel | NV | | | | | | | | |
| Nacure 5543 (Note 6) | NV | | | 1 | | 1 | 1 | 1 | 1 |
| Surface conditioner (Note 2) | NV | 0.1 | 0.1 | 0.1 | 0.1 | 0.1 | 0.1 | 0.1 | 0.1 |
| UV absorber (Note 3) | NV | 2 | 2 | 2 | 2 | 2 | 2 | 2 | 2 |
| Benzene rings in film (%) | | 8 | 10 | 19 | 12 | 19 | 28 | 26 | 29 |

NV: Amount of nonvolatile matter (parts)

Film Forming Conditions

Using the viscosity-adjusted coating compositions of Examples and Comparative Examples, coating and baking experiments were carried out.

A 0.8 mm (thickness) zinc phosphated dull-finished steel sheet was electrodeposited with an epoxy resin-based cationic electrodeposition coating composition in a dry thickness of about 20 μm and baked. Then, an automotive intermediate coat surfacer was further coated on the above baked surface in a dry thickness of trade name), the above test substrate was coated with Magicron Base Coat HM-22 (Kansai Paint, a metallic coating, a trade name) in a cured film thickness of about 15 μm and allowed to stand at room temperature for about 3 minutes. Then, using the same air spray gun F5 as mentioned above, this substrate was further coated with one of the above viscosity-adjusted coating compositions of Examples 1 through 15 and Comparative Examples 1 through 8 in a cured film thickness of about 40 μm and allowed to stand for setting at room temperature for about 10 minutes. The coated substrate was then heated for curing in an electric hot air oven at 140° C. for 30 minutes.

For the determination of gel fractions, each of the coating compositions of Examples 1 through 14 and Comparative Examples 1 through 8 was applied to a tin plate in a cured film thickness of about 40 μm.

The coated and baked substrates were subjected to various tests. The results are shown in Table 4.

Water resistance: Each sample was immersed in warm water at 40° C. for 240 hours and, then, rinsed and the coated surface was observed and rated on the following scale.
5: No change at all
4: Slightly delustered Solvent resistance: The coated surface was wiped 10 times with gauze soaked in xylene and, then, observed and rated on the following scale.
5: No change at all

TABLE 4

| Example No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Test item | | | | | | | | | | | | | | |
| Film appearance | 5 | 5 | 5 | 5 | 5 | 5 | 5 | 5 | 5 | 5 | 5 | 5 | 5 | 5 |
| 20° Specular gloss | 96.7 | 97.5 | 98.3 | 96.8 | 96.0 | 98.1 | 97.0 | 96.7 | 97.5 | 98.3 | 96.8 | 96.0 | 98.0 | 97.1 |
| Pencil hardness | H | H | H | H | F | H | H | H | H | H | H | F | H | H |
| Acid resistance | 5 | 5 | 5 | 5 | 5 | 5 | 5 | 5 | 5 | 5 | 5 | 5 | 5 | 5 |
| Water resistance | 5 | 5 | 5 | 5 | 5 | 5 | 5 | 5 | 5 | 5 | 5 | 5 | 5 | 5 |
| Solvent resistance | 5 | 5 | 5 | 5 | 5 | 5 | 5 | 5 | 5 | 5 | 5 | 5 | 5 | 5 |
| Mar resistance | 5 | 5 | 5 | 5 | 5 | 5 | 5 | 5 | 5 | 5 | 5 | 5 | 5 | 5 |
| Weather resistance | 5 | 5 | 5 | 5 | 5 | 5 | 5 | 5 | 5 | 5 | 5 | 5 | 5 | 5 |
| Gel fraction rate (%) | 96 | 97 | 96 | 97 | 97 | 96 | 96 | 96 | 97 | 96 | 97 | 97 | 96 | 96 |
| Impact deformation resistance (cm) | 50 | 50 | 50 | 50 | 50 | 50 | 50 | 50 | 50 | 50 | 50 | 50 | 50 | 50 |

| Comparative Example No. | 1 | 2 | 3 | 4 | 5 | 6 | 7 | 8 |
|---|---|---|---|---|---|---|---|---|
| Test item | | | | | | | | |
| Film appearance | 4 | 5 | 5 | 5 | 5 | 5 | 3 | 3 |
| 20° Specular gloss | 83.4 | 89.5 | 92.0 | 89.5 | 92.0 | 92.0 | 89.1 | 89.7 |
| Pencil hardness | H | H | H | H | H | H | H | H |
| Acid resistance | 3 | 3 | 3 | 3 | 3 | 4 | 5 | 5 |
| Water resistance | 5 | 5 | 5 | 5 | 5 | 5 | 5 | 5 |
| Solvent resistance | 5 | 5 | 5 | 5 | 5 | 5 | 5 | 5 |
| Mar resistance | 2 | 2 | 3 | 2 | 3 | 3 | 5 | 5 |
| Weather resistance | 5 | 5 | 5 | 5 | 5 | 4 | 4 | 4 |
| Gel fraction rate (%) | 96 | 96 | 95 | 96 | 95 | 96 | 96 | 96 |
| Impact deformation resistance (cm) | 50 | 50 | 50 | 50 | 50 | 30 | 50 | 40 |

The tests shown in Table 4 were performed by the following procedures.

Test Procedures

Film appearance: The appearance of each film was rated for glamour (brightness) and fatness (solid feeling) on the following scale.
5: Excellent, 4: Good, 3: Poor 20° Specular gloss: The mirror reflectance was measured at 20° in accordance with JIS K 5400.

Pencil hardness: The pencil scratch value was determined in accordance with JIS K 5400.

Acid resistance: The artificial rain, 0.4 ml, was dripped on the test sample, which was then heated on a hot plate at 85° C. for 15 minutes. The heated sample was rinsed and the coated surface was observed and rated on the following scale.
5: No change at all
4: The coated surface is flawless but a slight gradient in profile is found along the boundary between the dripped and non-dripped areas.
3: The coated surface shows blushing. The composition of artificial rain: 19.6 g of 1 mg/g solution of $NaNO_3$, 5.2 g of 1 mg/g solution of $KNO_3$, 3.7 g of 1 mg/g solution of $CaCl_2.2H_2O$, 8.2 g of 1 mg/g solution of $MgSO_4.7H_2O$, 73.3 g of 1 mg/g solution of $(NH_4)_2SO_4$, 30.0 g of 0.1 N—$H_2SO_4$, 20.0 g of 0.1 N—$HNO_3$, 10.0 g of 0.05 N—HCl and 4.7 g of 1 mg/g solution of NaF; adjusted to pH 1 with $H_2SO_4$.

4: The coated surface has noticeable mars
3: The coated surface has been swollen, with a blushing tendency.

Mar resistance: An automobile with the coated substrate sheet on the roof was washed 5 times with a car washer and the coated surface was observed. As the car washer, Yasui Sangyo's PO 20FWRC was used. The rating scale was as follows.
5: No visually detectable scratches; acceptable
4: Some scratches are noticeable but slight in degree
3: Visually conspicuous scratches; reject
2: Visually pronounsed scratches; reject Gel fraction rate: The coating film exfoliated from the substrate tin plate was placed in a stainless steel wire-mesh vessel (300 mesh) and extracted with acetone-methanol (1:1) for 6 hours. Then, the gel fraction was calculated by means of the following equation.

$$\text{Gel fraction (\%)} = \frac{\text{Weight of sample after extraction}}{\text{Weight of sample before extraction}} \times 100$$

Weather resistance: The coated surface was exposed to a sunshine weather-o-meter for 1600 hours, after which the surface was observed and rated on the following scale.
5: No abnormality
4: Some hair cracks observed
3: Cracked Impact deformation resistance: The test was carried out according to JIS K 5400. Using a Du Pont impact tester, a weight of 500 g (impact core diameter of ½ inch) was dropped on the coated surface and the maximum dropping distance (cm) which did not cause cracking or exfoliation of the coat was determined.

We claim:

1. A curable top coating composition comprising:
   (A) a hydroxyl-containing vinyl resin containing 45 to 55% by weight of styrene monomer as copolymerized unit of the resin,
   (B) at least one crosslinking agent selected from the group consisting of amino resins, polyisocyanate compounds and blocked polyisocyanate compounds, and
   C) a microparticulate polymer having an average particle diameter within the range of 0.01 to 1 μm and containing 40 to 60% by weight of styrene monomer as a copolymerized component of each particle, wherein the cured film from said coating composition contains the styrene-derived benzene ring in a proportion of 13 to 40% by weight of the total resin solids.

2. The top coating composition of claim 1 wherein said hydroxyl-containing vinyl resin has a weight average molecular weight in the range of 3000 to 30000.

3. The top coating composition of claim 1 wherein said hydroxyl-containing vinyl resin has a hydroxyl value in the range of 60 to 140 mg KOH/g.

4. The top coating composition of claim 1 wherein said hydroxyl-containing vinyl resin is a resin obtainable by copolymerizing a monomeric mixture consisting of 45 to 55% by weight of styrene monomer, 5 to 45% by weight of a hydroxyl-containing vinyl monomer and 1 to 45% by weight of a (meth)acrylic ester of a monoalcohol of 4 to 24 carbon atoms.

5. The top coating composition of claim 1 wherein said amino resin is at least one species selected from the group consisting of hexamethoxymethylmelamine and an etherified melamine resin prepared by partial or complete substitution of its methoxy groups with $C_4$ or higher alcohols.

6. The top coating composition of claim 1 wherein, on the basis of the total weight of said components (A), (B) and (C), (A) accounts for 33 to 90% by weight, (B) for 7 to 33% by weight and (C) for 0.1 to 33% by weight.

7. The top coating composition of claim 4 wherein said hydroxyl-containing vinyl monomer is at least one species selected from the group consisting of 1,4-butanediol monoacrylate and ε-caprolactone-modified acrylate monomers.

8. The top coating composition of claim 1 or 5 wherein the coating composition further comprises a curing catalyst for said amino resin which is selected from the group consisting of acids and amine salts of acids.

9. The top coating composition of claim 1 wherein the coating composition further comprises an organic solvent.

10. A coating method comprising using the coating composition of claim 1 as a top coating composition in a 2-coat/1-bake system wherein a substrate is coated with a colored base coat and a clear top coat in succession and then baked.

11. A coated article prepared by coating the coating composition of claim 1 on an article.

* * * * *